United States Patent [19]
Thomire

[11] Patent Number: 5,743,370
[45] Date of Patent: Apr. 28, 1998

[54] HYDRAULIC CLUTCH RELEASE BEARING FOR A MOTOR VEHICLE DIAPHRAGM CLUTCH

[75] Inventor: Sylvain Thomire, Levallois, France

[73] Assignee: Valeo, Paris, France

[21] Appl. No.: 718,095

[22] Filed: Sep. 11, 1996

[30] Foreign Application Priority Data

Sep. 14, 1995 [FR] France .................. 95 10748

[51] Int. Cl.⁶ .................................. F16D 25/08
[52] U.S. Cl. .................. 192/85 CA; 192/91 A; 192/98; 92/86
[58] Field of Search ............... 192/85 CA, 91 A, 192/98; 92/86, 107

[56] References Cited

U.S. PATENT DOCUMENTS 3,474,888  10/1969  Carlson .
4,979,602  12/1990  Fukushima .................. 192/85 CA

FOREIGN PATENT DOCUMENTS

| 2 692 950 | 12/1993 | France . |
| 20 23 252 | 8/1971 | Germany . |
| 34 27 791 | 1/1986 | Germany . |
| 43 13 346 | 10/1994 | Germany . |
| 44 12 734 | 3/1995 | Germany . |
| 44 27 942 | 3/1995 | Germany . |
| 599807 | 3/1948 | United Kingdom . |
| 2 256 907 | 12/1992 | United Kingdom . |
| 90 04116 | 4/1990 | WIPO . |

*Primary Examiner*—Richard M. Lorence
*Attorney, Agent, or Firm*—Longacre & White

[57] ABSTRACT

A fluid pressure operated clutch release bearing for a diaphragm clutch of a motor vehicle includes a fixed part which comprises a cylindrical annular external body and an internal tube. The body and tube together define an annular cavity, into which pressurised fluid is fed for controlling the release bearing by actuation of a tubular piston, which slides axially in the cavity and which has a front end portion that carries an actuating element which acts on the clutch diaphragm. This front end portion also carries a finned sealing ring which cooperates with the outer peripheral surface of the tube, so as to restrict leakage of fluid through the annular space which is defined between the outer surface of the tube and the internal bore of the piston; and the piston has at least one evacuation orifice which connects the annular space to a zone in which leaked fluid can be recovered.

14 Claims, 3 Drawing Sheets

HYDRAULIC CLUTCH RELEASE BEARING FOR A MOTOR VEHICLE DIAPHRAGM CLUTCH

FIELD OF THE INVENTION

The present invention relates to clutch release bearings, and more particularly to so-called hydraulic clutch release bearings, i.e. those which are adapted for control, by a pressurised operating fluid (which may be liquid or gaseous), of a diaphragm clutch, especially for motor vehicles, the clutch release bearing being of the type which has a fixed part which includes an external cylindrical annular body and an internal support and guide tube which is coaxial with the external body, and which defines, with the latter, a blind annular cavity adapted to be supplied with the said operating fluid under pressure, with a tubular piston being mounted for axial sliding movement within the said annular cavity so as to delimit a control chamber (also referred to herein as a hydraulic control chamber) of the clutch release bearing, the piston having a front end portion which projects out of the control chamber and which carries an actuating element adapted to work on the diaphragm of a clutch.

BACKGROUND OF THE INVENTION

One example of such a clutch release bearing is described and shown in French published patent specification No. FR 2 692 950 A. That release bearing is capable of being controlled by means of a fluid of either the gaseous or liquid type.

It should be noted that a fluid-pressure operated clutch release bearing tends to be conventionally referred to as a hydraulic, or hydraulically controlled, clutch release bearing, and the associated clutch as a hydraulic clutch, even if the operating fluid is gaseous. This convention is adopted here.

In the type of release bearing taught in the above mentioned French specification, contaminants can penetrate into the cavity which, with the piston, defines the variable volume control chamber, and this can adversely affect operation of the release bearing. In addition, the control fluid, especially when this is a liquid, can escape out of the control chamber, and in particular between the outer peripheral surface of the internal tube and the bore of the tubular piston. Apart from the fact that there is then actual loss of pressurised control liquid, the latter tends to leak into the interior of the associated clutch, with which the clutch release bearing is mounted concentrically.

Leaking hydraulic fluid can then reach various components of friction materials, and particularly the friction liners of the clutch friction disc, which is of course seriously detrimental to proper operation of the friction clutch.

DISCUSSION OF THE INVENTION

An object of the present invention is to overcome this disadvantage in a simple and inexpensive way.

According to the invention, a hydraulically controlled clutch release bearing (as defined above) for a diaphragm clutch, comprising a fixed part which includes an external cylindrical annular body and an internal support and guide tube which is coaxial with the external body, and which defines, with the latter, a blind annular cavity adapted to be supplied with a liquid or gaseous operating fluid under pressure, with a tubular piston being mounted for axial sliding movement within the said annular cavity so as to delimit a control chamber (also referred to as a hydraulic control chamber) of the clutch release bearing, the piston having a front end portion which projects out of the control chamber and which carries an actuating element adapted to work on the diaphragm of a clutch, is characterised in that, firstly, the front end portion of the piston is provided with a finned sealing ring, which cooperates with the outer peripheral surface of the internal tube so as to restrict any escape of said fluid through the annular space which is delimited between the outer peripheral surface of the internal tube and the internal bore of the piston, and secondly, the piston has at least one evacuation orifice which connects the said annular space to a zone for recovery, in the said zone, of said fluid into the said annular space, the said recovery zone being bounded by the outer periphery of the piston.

In this way, leakage of pressurised fluid out of the control chamber is controlled, and the leaked fluid is recovered, while the finned sealing ring protects the outer peripheral surface of the internal tube on which the piston is guided in sliding movement. The finned sealing ring prevents contaminants from penetrating into the said cavity which constitutes the control chamber of the clutch release bearing. The volume of this control chamber is variable, and is defined by the piston in cooperation with the cavity.

Preferably, the finned sealing ring includes a lip which cooperates, with inward radial elasticity, with the outer peripheral surface of the internal tube, in order to obtain good recovery of leaked fluid.

According to a preferred feature of the invention, the body portion of the finned sealing ring is mounted within a cylindrical annular seating, which is open axially in the transverse front end face of the tubular piston. In that case, preferably, the finned sealing ring includes an armature in the form of a cylindrical sleeve, which is tightly fitted within the cylindrical annular seating, so that the finned sealing ring is retained within the seating.

In the interests of good protection, the finned sealing ring is preferably disposed entirely within the cylindrical annular seating.

According to another preferred feature of the invention, the rear end of the piston, which is received in axial sliding relationship within the hydraulic control chamber, is equipped with a sealing member which includes at least one lip that cooperates with the outer peripheral surface of the internal tube.

The evacuation orifice is preferably a simple hole formed in the body of the piston.

The evacuation orifice is open in the outer peripheral surface of the piston, and a sealing bellows is arranged between the rear end portion of the external body, the front end portion of the piston, and the actuating element, so as to delimit, and to seal, the zone of recovery of said leaked fluid into which the evacuation orifice drains. Preferably then, the annular external body includes an evacuation passage which connects the said fluid recovery zone with a drain tube for removal of said leaked fluid.

In this last mentioned arrangement, according to a further preferred feature of the invention, the rear end portion of the annular external body includes an external radial collar portion which defines a transverse face for abutment of an axial end of a preloading spring of the clutch release bearing, the said spring being mounted in axial compression between the said transverse abutment face and an abutment surface carried by the front end portion of the piston.

The evacuation passage is preferably formed in this collar portion. In that case, in a preferred embodiment of clutch release bearing according to the invention, the evacuation passage comprises a blind axial bore which is open in the said transverse face, and a blind radial hole which is open at one end into the blind axial bore, and at the other end in the peripheral surface of the collar portion, for connection of the drain tube in the said radial hole.

In this last mentioned embodiment, in order to prevent the preloading spring from rotating, the blind axial bore of the evacuation passage preferably receives, with a clearance, the axially orientated terminal finger of the preloading spring.

According to yet another preferred feature of the invention, the rear end portion of the annular external body includes two tube connectors in which a feed duct and a purge duct for the hydraulic control chamber are formed respectively, each said tube connector extending outwardly.

The pipe connectors preferably project outwardly from the outer peripheral surface of the collar portion of the external body. Alternatively or in addition, the blind axial bore is preferably open in a portion of the peripheral surface of the collar portion lying between the two pipe connectors.

Further features and advantages of the present invention will appear more clearly on a reading of the following detailed description of a preferred embodiment of the invention, which is given by way of example only and with reference to the accompanying drawings.

DESCRIPTION OF A PREFERRED EMBODIMENT OF THE INVENTION

Figure 1:
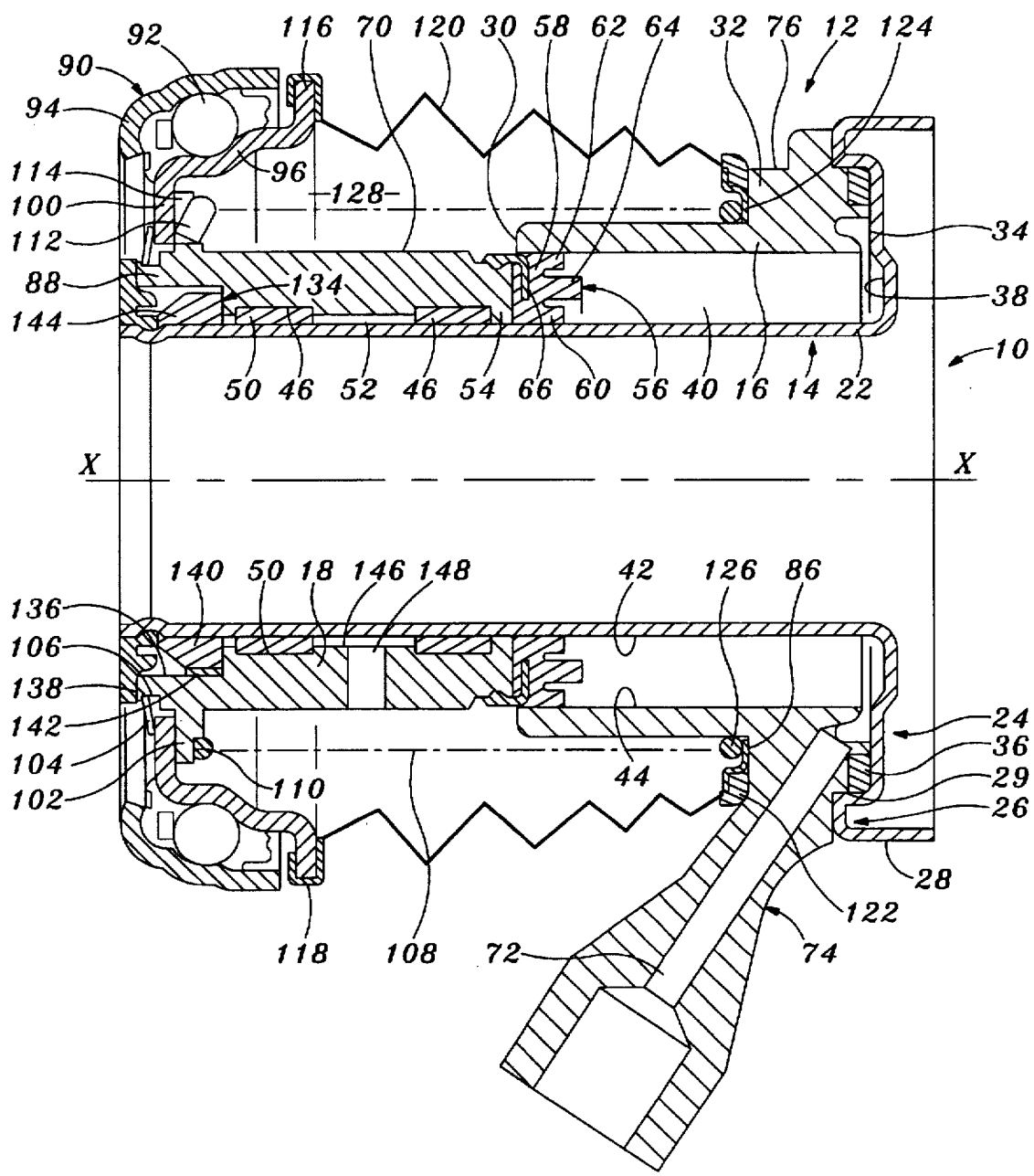
FIG. 1 is a view in axial cross section taken on the line 1—1 in FIG. 3, and shows a hydraulically controlled clutch release bearing made in accordance with the present invention, the clutch release bearing being shown in an active position, that is to say in a position which corresponds to a command for disengagement of a clutch.

The drawings show a fluid pressure operated clutch release bearing 10, which is arranged to be fitted concentrically in a friction clutch, not shown in the drawings.

The design of such a clutch is for example described and shown in detail in French published patent specification FR 2 730 532A.

In this example, the clutch release bearing 10 is of the hydraulic type proper, being controlled with an operating fluid in the form of a liquid.

The clutch release bearing 10 consists essentially of a fixed part 12 and a movable part 18. The fixed part 12 comprises an internal support and guide tube 14 and an annular cylindrical external body 16, while the movable part 18 consists essentially of a generally tubular piston.

The support and guide tube 14 is made from metal plate by a deep drawing process. It is longer in the axial direction than the body 16, and projects axially beyond the latter. The tube 14 defines a central axis X—X of the clutch release bearing, and is extended at its rear end 22, i.e. the end seen on the right hand side in FIG. 1, by a transverse flange 24 extending radially outwardly. The transverse flange 24 has an axial channel portion 26 which projects forwardly from the radial plane of the main portion of the transverse flange 24. The channel portion 26, which is open towards the right in FIG. 1, is extended axially by a rearwardly extending, axially oriented, terminal skirt portion 28, having the general form of a sleeve and arranged to be centred in a portion (not shown) of a fixed component of the vehicle. This fixed component may for example consist of the casing of a gearbox.

The external, generally annular, cylindrical body 16 is delimited by an annular front radial face 30, and its rear part consists of a collar portion 32 which projects radially outwardly. The transverse rear face 34 of the collar portion 32 is formed with a rebate at its outer periphery, so as to have a profile which is complementary to that of the transverse flange 24 of the support and guide tube 14 with its channel portion 26, against which the collar portion 32 is in axial abutment.

A sealing ring 36 is interposed between the rear transverse face 34 of the collar portion 32 of the external body 16 and the portion of the inner surface 38 of the flange 24 which lies facing it. The complementary form of the profile of the rear transverse face 34 and transverse flange 24 ensure that the annular external body 16 is centred with respect to the internal support and guide tube 14.

These two coaxial members 14 and 16 thus define between them a cylindrical cavity 40, which is bounded radially on the inside by the outer peripheral surface 42 of the internal tube 14. On the outside, considered radially, the cavity 40 is bounded by the internal bore 44 of the annular external body 16, while it terminates axially at the rear end at the inner face 38 of the transverse flange 24. The cavity 40 is accordingly of generally annular form, and is blind at its rear end. The cavity 40 is arranged to be supplied with hydraulic control liquid under pressure in a manner known per se.

The piston 18 is mounted for sliding movement within the cavity 40, with which it defines the variable volume hydraulic control chamber of the clutch release bearing. The piston 18 slides, on its internal bore 52, axially along the outer peripheral surface 42 of the support and guide tube 14, and part of the piston projects axially out of the body 16. Accordingly, the volume of the hydraulic control chamber 40 is variable by movement of this piston.

More precisely, the piston 18 is guided in its sliding movements along the axis X—X, with respect to the fixed part 12 of the clutch release bearing, by means of two interposed guide and friction sleeves 46. Each of these guide and friction sleeves 46 has a generally longitudinal split 48 (FIG. 3), and is mounted in a complementary groove 50 which is formed in the internal bore 52 of the tubular piston 18. In another version, the guide sleeves 46 may be formed with internal splines.

At its rear end 54, the tubular piston 18 is provided with a sealing member 56 of a suitable elastomeric material. The sealing member 56 has a body portion 58 for securing it on the rear portion 54 of the piston 18. An inner sealing lip 60 projects from the body portion 58 and cooperates with the outer peripheral surface 42 of the support and guide tube 14, while an outer sealing lip 62 of the member 56 cooperates sealingly with the internal bore 44 of the annular external body 16. The sealing member 56 also includes a central abutment 64 which projects from the body portion 58, and which, in the rest position (not shown) of the clutch release bearing 10, is in axial abutment against the portion, in facing relationship with it, of the inner face 38 of the rear transverse flange 24 of the tube 14. The purpose of this abutment 64 is to reduce noise during the return movement of the piston 18 towards its rest position.

The sealing member 56 is carried on the rear end 54 of the piston 18, to which it is attached by means of an annular fastening member 66 which has an L-shaped profile in transverse cross section. This fastening member 66 is of metal, and its transversely oriented branch is anchored, or encapsulated, within the body portion 58 of the sealing member 56, while its axially oriented branch is engaged in the cylindrical outer peripheral surface 70 of the piston 18. The fastening member 66 is also provided with inclined lugs which are formed by press-forming and bending. These lugs are engaged in a groove which is formed in the surface 70, so that the sealing member 56 can be snap-fitted on the axially oriented annular portion of the fastening member 66.

At its rear end 54, the piston 18 is of reduced diameter as can be seen in FIG. 1, so that the axially oriented portion of the fastening member 66 will not project radially outwards from the outer cylindrical surface 70 of the piston 18. Each of the lugs in the axial branch of the member 66 has a bead which fits in the above mentioned groove.

The cavity 40, and therefore the hydraulic control chamber which is bounded sealingly by the sealing member 56 of the piston 18, is supplied with control liquid under pressure through a feed duct 72, in the form of a bore in a tube connector 74, which is made integrally by moulding with the annular external body 16.

As already mentioned, the control fluid may be in either liquid or gaseous form; but here, the control chamber is a hydraulic control chamber supplied with a liquid under pressure. In FIG. 1, the clutch release bearing is in its control position with the hydraulic control chamber 40 being pressurised. When the control chamber is depressurised, the piston 18 moves to the right in FIG. 1, so as to reduce the volume of the cavity 40, under the force exerted by the diaphragm of the clutch.

The tube connector 74 extends outwardly as shown, and is inclined with respect to the axis X—X as can be seen in FIG. 1, from the outer cylindrical surface 76 of the rear collar portion 32 of the external body 16.

Figure 3:
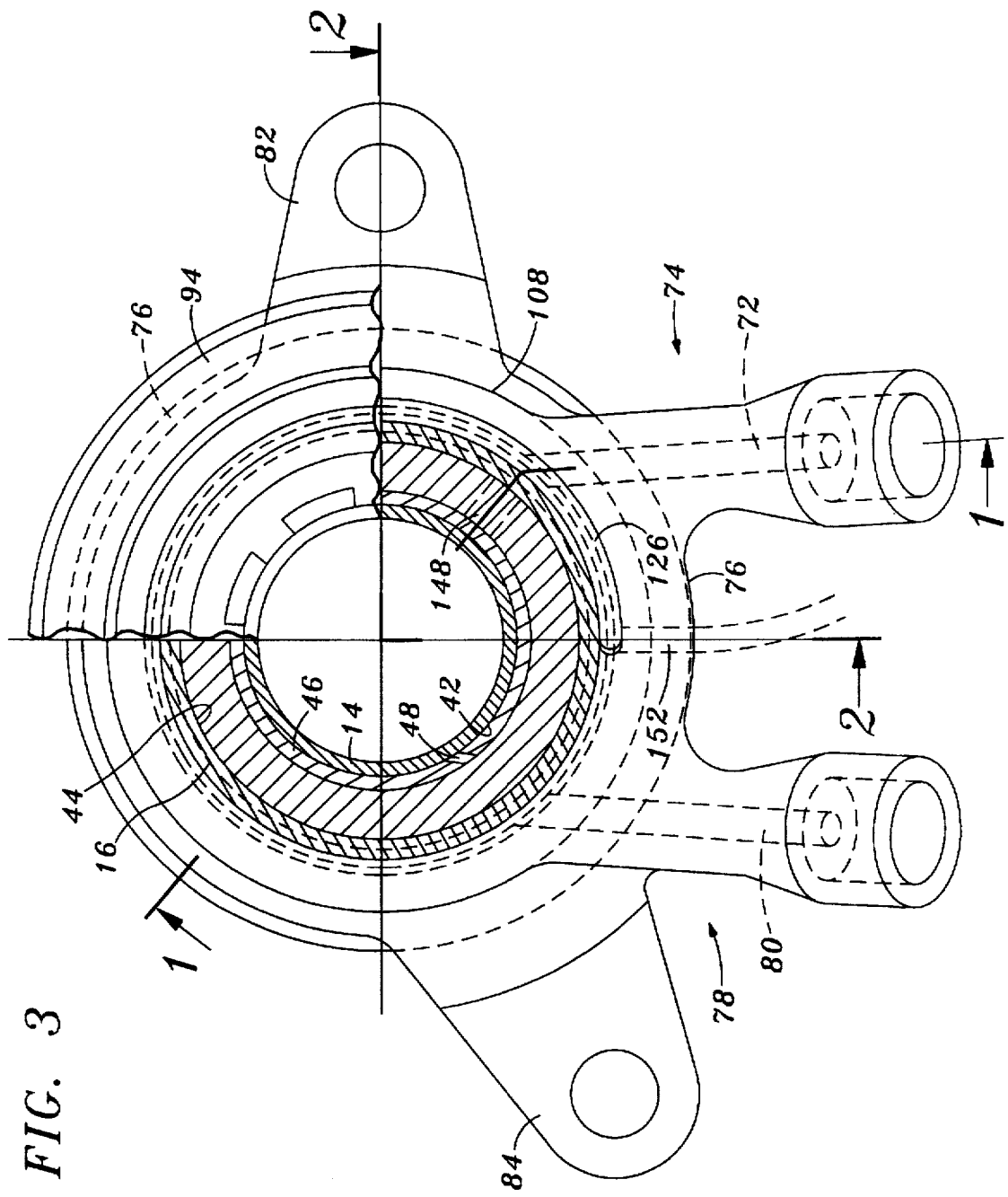
FIG. 3 is a view as seen from the left hand side of FIG. 2, shown partly in cross section on the line 3—3 in FIG. 2.

As can be seen in FIG. 3, the body 16 also has a second tube connector 78 having a bore 80 which constitutes a purge duct for the hydraulic control chamber. The two tube connectors 74 and 78 are offset angularly from each other, and are disposed symmetrically with respect to the diametral plane of the clutch release bearing which extends vertically in FIG. 3.

Figure 2:
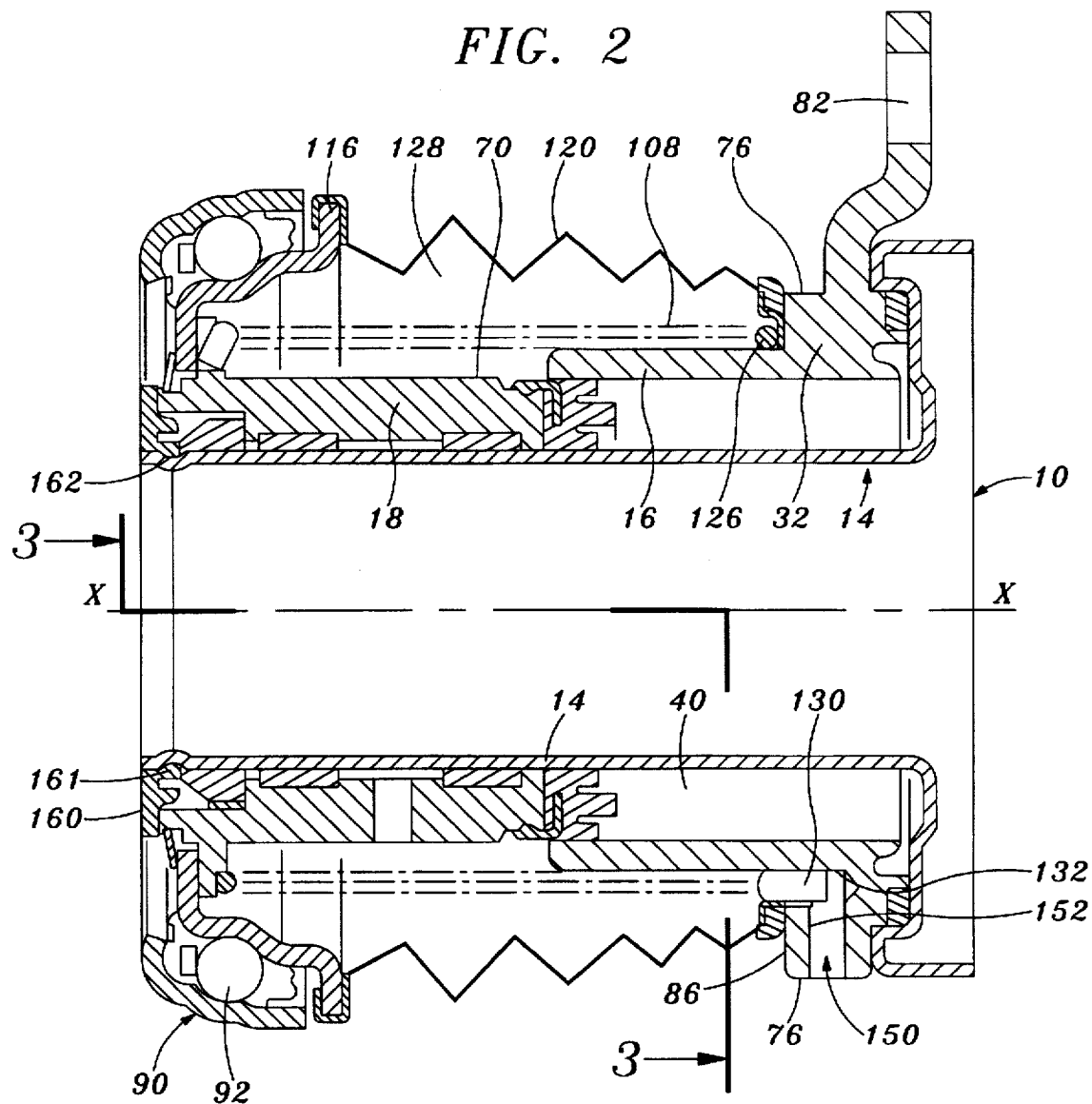
FIG. 2 is another view of the same clutch release bearing in the same position, FIG. 2 being shown in cross section taken on the line 2—2 in FIG. 3.

As can be seen in FIGS. 2 and 3, the external body 16 also has two substantially diametrically opposed mounting ears 82 and 84. These ears extend radially outwardly from the peripheral surface 76 of the rear collar portion 32 of the external body 16, so as to enable the clutch release bearing 10 to be fastened on a fixed component of the vehicle, such as a gearbox casing. When the clutch release bearing is secured in this way, the flange 24 is clamped between the collar portion 32 and the fixed component, with the channel portion 26 then centring the internal tube 14 on an axial annular surface 29 formed at the outer periphery of the collar portion 32, in the inner face 34 of the latter, the surface 29 having a profile which is complementary to that of the channel portion 26 as already mentioned.

The external radial collar portion 32 and the annular main part of the external body 16 together define a transverse engagement face 86 in the form of a shoulder.

The front end portion 88 of the piston 18 carries an actuating element 90 which is adapted to act on the inner end of the fingers of the diaphragm (not shown) of the clutch associated with the clutch release bearing 10. The actuating element 90 consists of a ball bearing having balls 92 and a profiled outer ring 94 which is adapted to cooperate with the inner ends of the diaphragm fingers. This bearing also has a fixed inner ring 96, which may for example be a press-formed metal plate component, and which includes a transverse annular flange 100 (referred to as the inner flange) of the ball bearing 90. The inner flange 100 extends radially inwardly towards the axis X—X of the clutch release bearing, for attachment to the front end portion 88 of the piston 18.

At its front end 88, the piston 18 has a transverse flange 102 which extends radially outwardly. The piston is made for example of a mouldable material, which may be an aluminium alloy, or a plastics material. The inner flange 100 of the ball bearing 92 bears on the front face of the flange 102, which is therefore adjacent to the ball bearing 92. An axially acting resilient ring 104, referred to as an auto-centring ring, bears at its outer periphery on the flange 100 so as to exert a force on the latter. In this example, the auto-centring ring 104 is a frusto-conical ring having its inner periphery divided into inclined lugs which bear against the flank, furthest away from the flange 102, of a groove 106 formed in the piston 18 between the free end of the latter and the flange 100. The ring 104 thus has a dihedral cross section, and it holds the inner flange 100 of the ball bearing in contact with the flange 102 of the piston 18.

The depth of the flange 100 is greater than the diameter of the balls 92 of the ball bearing. Thus the actuating element 90 is attached axially to the piston 18 while being able to be displaced radially with respect to the latter. In this way, and in a manner known per se, the clutch release bearing 10 is of an automatically centring kind in which the ball bearing 92 is able to float in the radial direction in order to centre itself automatically with respect to the diaphragm of the clutch.

The clamping force exerted by the auto-centring ring 104 depends on the application. This ring is so calibrated that the ball bearing will not fall of centre under the effect of its own weight.

In a known way, the clutch release bearing 10 includes resilient preloading means 108. In this example, the preloading means 108 are in the form of a coil spring which is mounted in axial compression, with one end bearing against the transverse rear shoulder 86 of the collar portion 32 of the body 16. The other end of the spring 108 bears against a transverse front shoulder 110, which is formed in the rear face of the piston flange 102 and which is defined in a rebate which provides centring for the coil spring 108 coaxially with the axis X—X.

A first terminal finger 112 of the wire of which the spring 108 is made, is oriented substantially radially. This finger 112 is received in a notch 114 formed in the piston flange 102, and therefore immobilises the spring 108 against rotation with respect to the piston 18.

The press-formed inner ring 96 of the ball bearing 92 extends radially outwardly of the body flange 102, and radially towards the rear, and is extended at its outer periphery by a flange 116, referred to as the outer flange of the ball bearing 92. This flange 92 extends radially outwardly. The flange 116 is offset axially away from the balls of the bearing 92, the latter being, in this example, a sealed bearing of a known design. The overall axial size of the clutch release bearing 10 is reduced with this arrangement, because most of the bearing 92 extends axially beyond the body flange 102 and towards the collar portion 32 of the body 16. The outer ring 94 of the bearing only extends beyond the piston 18 by a very small amount.

A sealing bellows 120 of the accordion type is fitted around the outer flange 116 of the bearing 92, so as to attach the bellows sealingly to the latter. For this purpose, the front end 118 of the bellows 120 has an annular internal radial groove which receives the outer flange 116. The bellows 120 is arranged between the rear end portion of the external body 16, the front end portion 88 of the piston 18, and the actuating member 90.

More precisely, the bellows 120 is frusto-conical, the end of the bellows having the greater diameter being the front end 118. Its other end, of smaller diameter, includes a radially oriented bead 122 which is sandwiched between the rear transverse shoulder 86 of the body collar portion 32 and a flange of a component 124, which is a cranked ring. In this example this cranked ring 124 is of metal, and the spring 108 bears axially, through its rearmost turn 126, against the transverse shoulder 86 through the cranked ring 124.

In other words, the spring 108 clamps the member 124 into contact with the shoulder 86, with the member 124 enabling the fastening bead 122 of the bellows 122 to be clamped in contact with the transverse shoulder 86 radially outwardly of the spring 108.

It will be noted that the accordion bellows 120 surrounds and protects the spring 108, the piston 18 and the hydraulic control chamber 40, by preventing the ingress of soil, dirt, impurities and other contaminants, and thereby defines within the bellows a sealed zone 128 which is also bounded by the outer periphery 70 of the piston 18.

As can be seen in FIG. 2, the rearmost turn 126 of the spring 108 terminates in a terminal finger 130 which is oriented axially and which is received in a blind axial bore 132 formed in the collar portion 32 of the body 16. This axial bore is open in the transverse engagement face 86 of the collar portion 32. The spring 108 is thus held against rotation with respect to the annular external body 16, that is to say the piston 18 is prevented by the interposed spring 108 from rotating with respect to the body 16 and with respect to the internal tube 14.

At its front end 88, the piston 18 includes a finned sealing ring 134 which is mounted in an annular cylindrical seating in the form of a rebate 136. This seating 136 is open in the annular free front end face 138 of the piston 18.

The ring 134 has a body portion 140 which is reinforced externally by a metal armature sleeve 142. The armature sleeve 142 is fitted tight in the annular seating 136 so as to retain in the latter the finned sealing ring 134, which in this example lies entirely within the rebate 136. The ring 134 also has a sealing lip or fin 144 which cooperates, with inward radial elasticity, with the outer cylindrical surface 42 of the tube 14 when the piston 18 slides along the latter, so that the ring 134 acts in the manner of a squeegee.

In this way, the sealing ring 134 provides protection for the sliding surfaces of the piston 18 and chamber 40, so preventing contaminants from penetrating into the annular space 146 which is defined between the internal bore 52 of the piston 18 and the outer peripheral surface 42 of the tube 14. The finned sealing ring 134 also prevents any escape of pressurised control liquid in the outward direction from the annular space 146, so that the control liquid cannot pollute the friction surfaces of the associated clutch. Any leakage of liquid is thus retained within the annular space 146.

Means 148 are provided for evacuating and recovering these leaks. In this connection, it will be appreciated that the split 48 in that one of the guide and friction sleeves 46 that lies closer to the sealing ring 134 enables leaked liquid to pass through, but that the purpose of these splits is to facilitate the fitting of the sleeve 46 in its groove 50. In this example, for simplicity, the guide and friction sleeves 46 are identical to each other.

The leakage control means 148 comprise an evacuation orifice 148. In this example this is in the form of a radial hole which is formed substantially halfway along the body portion of the tubular piston 18, through the wall of the latter. In a modified version, the hole formed in the body of the piston may be inclined towards the actuating element 90.

In the active position of the clutch release bearing shown in FIG. 1, in which the cavity or chamber 40 is pressurised, the orifice 148 thus connects the annular space 146 to the zone 128 that is sealed by the bellows 120, the piston 18, the ball bearing 92, and the external body 16.

Leaks of liquid, scavenged into the annular space 146 by the finned sealing ring 134, can thus be evacuated radially outwardly through the evacuation orifice 148, which drains at the outer peripheral surface 70 of the piston 18. The liquid so collected accumulates in the recovery zone 128, and is thrown against the bellows by centrifugal force.

In order to evacuate the leaked liquid recovered in the zone 128, a leakage evacuation passage 150 is formed in the external body 16. In the present example the passage 150 is formed in the collar portion 32 of the body 16. With particular reference to FIG. 2, it can be seen that in this example the evacuation passage 150 is defined partly by the axial bore 132 in which the terminal finger 130 of the spring 108 is received. The finger 130 fits loosely, i.e. with a radial clearance, in the bore 132. The evacuation passage 150 is also partly defined by a open at one end into the bore 132, and radial hole 152 which is open at its other end in the peripheral surface 76 of the rear collar portion 32 of the annular external body 16. The leaked liquid is thus able to pass from the recovery zone 128 through the passage 150, to an external drain tube 154 (indicated diagrammatically in FIG. 3), which can be fitted within the hole 152.

The finned sealing ring 134 thus prevents any liquid from leaking into the clutch, while the evacuation orifice 148 and the evacuation passage 150 ensure that the leaked liquid will be recovered out of the hydraulic control chamber 40 and taken away from the clutch.

Because the guide and friction sleeves 46 are split sleeves by virtue of the split 48, they have no influence on the flow of the leaking liquid towards the annular collection space 146. It will be noted that the spring finger 130 cooperates circumferentially with the bore 132 so as to prevent any rotation of the spring 108.

It will be understood that the invention is not limited to the embodiment described above and shown in the drawings. In particular, the finned sealing ring 134 may be of any known design suitable for sealing the annular space 146 and preventing penetration of any pollutants into the space 146 and therefore into the hydraulic chamber 40.

Similarly, the sleeves 46 may be of a continuous kind, i.e. without a split, and be instead provided with internal grooves to allow the leaked liquid to pass them.

As will have been understood, the auto-centring ring 104 enables the flange 100 of the ball bearing 92 to be held sealingly in contact with the flange 102. In this way, the inner ring 96 of the bearing seals the recovery zone 128 which is sealingly closed by the bellows 120. In another version, the outer ring 94 of the bearing may be of more massive construction.

It will be appreciated that a thrust ring 160 (see FIG. 2) is fitted at the free end of the internal tube 14. This thrust ring 160 is force-fitted on to the outer surface 42 of the tube 14, and has at its inner periphery a bead 161 which is engaged in a complementary groove 162 of the tube 14, in which it is snap-fitted. Thus the thrust ring 160, which is preferably moulded in a plastics material, masks the finned sealing ring 134 and thereby protects it from outside influences. The thrust ring 160 acts as an end stop for limiting the axial movement of the piston 18 (see FIGS. 2 and 3).

Thus, before being fitted on to the fixed part of the vehicle such as the gearbox casing, the clutch release bearing 10 constitutes a unitary assembly which is readily handled and transported, because the free end 138 of the piston is in contact with the thrust ring 160 under the action of the spring 108. In consequence, the flange 24 is in contact with the rear face 34 of the collar portion 32 of the external body 16, being centred by its channel portion 26.

When the clutch release bearing is fitted in place in the vehicle, there is an axial clearance between the thrust ring 160 and the free front end face 138 of the piston 18. In the event of any problem arising, for example a breakdown, the thrust ring 160 limits the movement of the piston 18, and thereby constitutes a safety abutment which prevents any damage occurring to the clutch. It also prevents the sealing member 56 escaping from the chamber 40.

In another version, the ball bearing 92 may be force-fitted on the front end portion 88 of the piston 18, so that it is then not radially displaceable. The ball bearing may then be provided with heavy rings, and the bellows 128 may be mounted on the flange 102.

It is of course possible to reverse the structures, with the inner ring of the ball bearing being rotatable and thereby acting on the diaphragm, while its outer ring is fixed and cooperates with the flange 102 through a transverse flange.

What is claimed is:

1. A fluid-pressure operated clutch release bearing for a diaphragm clutch, the release bearing having a fixed part which comprises an annular cylindrical external body and an internal support and guide tube coaxial with the said external body, the external body and the internal tube together defining between them a blind annular cavity for receiving pressurised fluid for actuation of the clutch release bearing, the clutch release bearing further including: a tubular piston mounted within the said cavity for axial sliding movement therein, whereby to define in the said cavity a control chamber of the clutch release bearing, the piston having a front end portion projecting out of the said control chamber; and an actuating element carried by the said front end portion of the piston for acting on a diaphragm of said clutch, wherein the clutch release bearing further includes a finned sealing ring carried by the front end portion of the piston, the said internal tube having an outer peripheral surface, the piston having an internal bore defining an annular space between the said internal bore and the said outer peripheral surface of the tube, the finned sealing ring cooperating with the outer peripheral surface of the tube to restrict any escape of said fluid through the said annular space, the clutch release bearing further having means, including the outer periphery of the piston, defining a leakage recovery zone for collection of any said fluid leaked into the said annular space, and the piston having at least one evacuation orifice connecting the said annular space with the said recovery zone.

2. A clutch release bearing according to claim 1, wherein the finned sealing ring has a lip which cooperates, with inward radial elasticity, with the outer peripheral surface of the internal tube.

3. A clutch release bearing according to claim 1, wherein the front end portion of the piston has a transverse terminal face and defines a cylindrical annular seating open axially into the said transverse terminal face, the finned sealing ring having a body portion mounted in the said seating and carrying the said lip.

4. A clutch release bearing according to claim 3, wherein the finned sealing ring further includes a cylindrical sleeve defining an armature around the body portion of the sealing ring, the said armature being fitted tightly in the said annular seating.

5. A clutch release bearing according to claim 3, wherein the said finned sealing ring lies entirely within the said annular seating.

6. A clutch release bearing according to claim 1, wherein the piston has a rear end portion received in axial sliding engagement in the said control chamber, and the release bearing further includes a sealing member carried on the said rear end portion of the piston, the said sealing member having at least one lip cooperating with the outer peripheral surface of the internal tube.

7. A clutch release bearing according to claim 1, wherein the piston defines a piston body, the said evacuation orifice being a hole formed through the piston body.

8. A clutch release bearing according to claim 1, wherein the evacuation orifice is open in the outer peripheral surface of the piston, the external body having a rear end portion, the clutch release bearing further including a sealing bellows extending between the rear end portion of the external body and the actuating element, whereby the said bellows, together with the external body of the piston, and the actuating element, constitute the said means defining the said recovery zone, the recovery zone being thereby sealed, and the evacuation orifice being open directly into the said recovery zone.

9. A clutch release bearing according to claim 8, further including an external drain tube for removal of said leaked fluid, the said annular external body defining an evacuation passage connecting the recovery zone with the said drain tube.

10. A clutch release bearing according to claim 9, wherein the front end portion of the piston defines a first spring abutment face, the rear end portion of the external body comprising an external radial collar portion defining a transverse second abutment face, the said evacuation passage being formed in the said collar portion, and wherein the clutch release bearing further includes a preloading spring mounted in axial compression between the said first and second abutment faces.

11. A clutch release bearing according to claim 10, wherein the collar portion of the external body has a peripheral surface, the said evacuation passage comprising a blind axial bore open in the said second abutment face and a blind radial hole open at one end into the said blind axial bore and, at the other end, in the said peripheral surface of the collar portion, the said radial hole of the evacuation passage being adapted for connection of the said external drain tube therein.

12. A clutch release bearing according to claim 11, wherein the said spring has an axially oriented terminal finger received with a clearance in the said blind axial bore of the evacuation passage.

13. A clutch release bearing according to claim 12, wherein the rear end portion of the annular external body further includes two outwardly extending tube connectors spaced apart by a portion of the said peripheral surface of the body, the said tube connector defining within them, respectively, a feed duct and a purge duct for the hydraulic control chamber, the said other end of the blind radial hole of the evacuation passage being open in the said peripheral surface portion.

14. A clutch release bearing according to claim 1, wherein the said internal tube has a free front end, the clutch release bearing further including a thrust element mounted at the said free end of the tube so as to limit axial movement of the piston and to protect the finned sealing ring.

* * * * *